Sept. 9, 1941.　　　J. M. McDONNELL　　　2,255,674
STATISTICAL CARD COMPARING MACHINE
Filed Dec. 21, 1939　　　6 Sheets-Sheet 1

INVENTOR
JOSEPH M. MC DONNELL
BY W. C. Spark
ATTORNEY

Sept. 9, 1941.  J. M. McDONNELL  2,255,674
STATISTICAL CARD COMPARING MACHINE
Filed Dec. 21, 1939     6 Sheets-Sheet 2

INVENTOR
JOSEPH M. MCDONNELL
BY H. A. Sparks
ATTORNEY

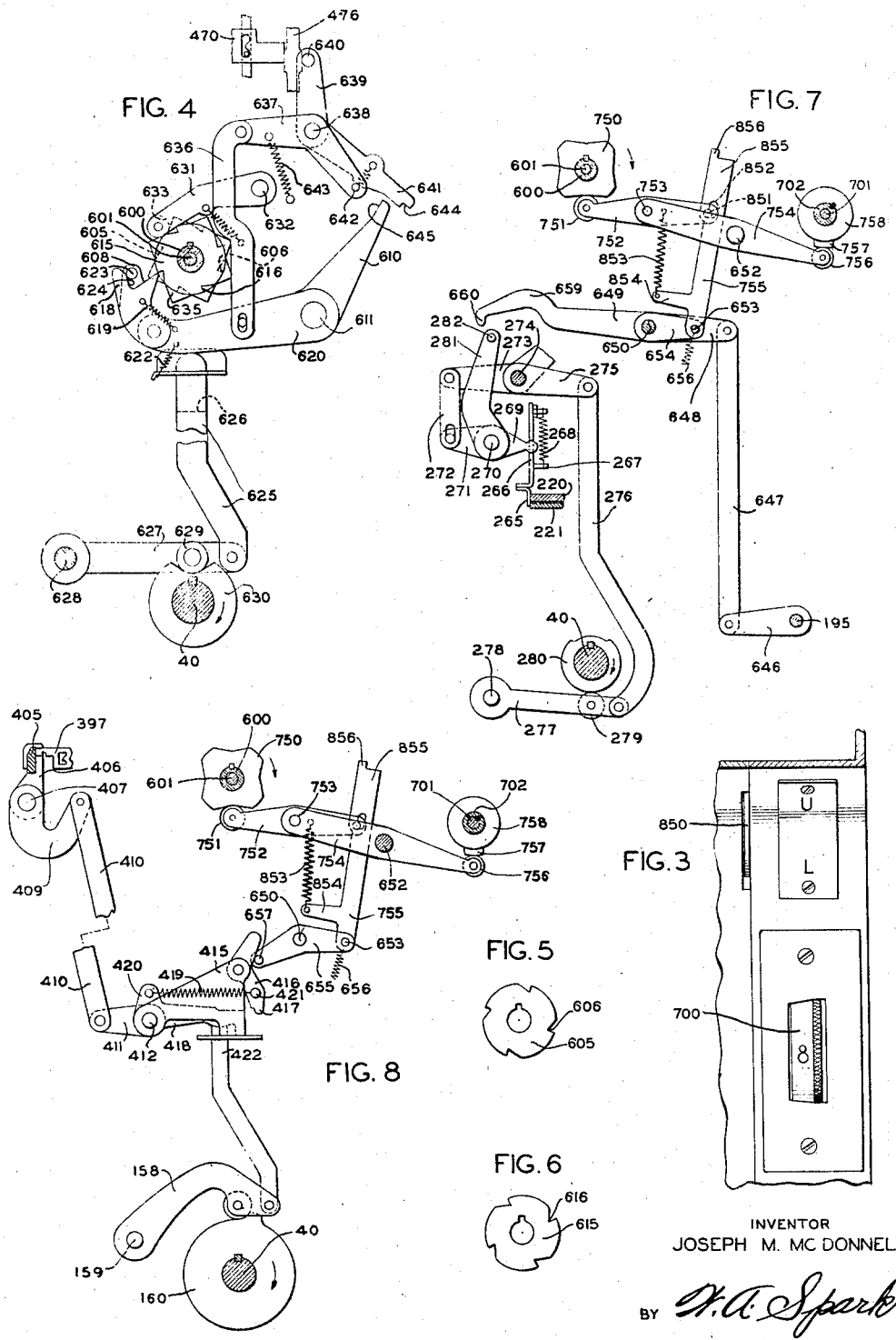

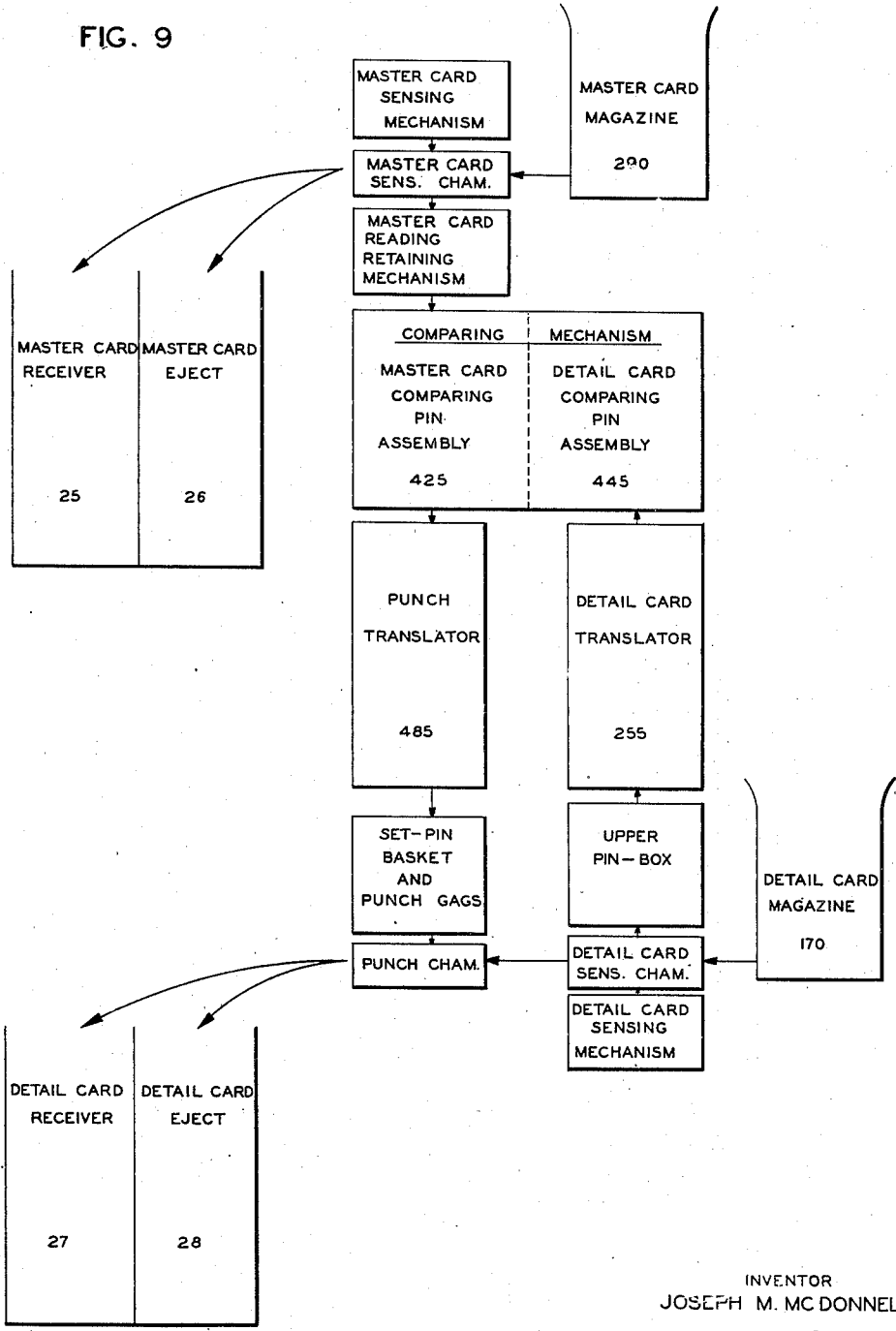

Patented Sept. 9, 1941

2,255,674

UNITED STATES PATENT OFFICE 2,255,674

STATISTICAL CARD COMPARING MACHINE

Joseph M. McDonnell, Baldwin, N. Y., assignor to Remington Rand Inc., Buffalo, N. Y., a corporation of Delaware Application December 21, 1939, Serial No. 310,383

43 Claims. (Cl. 164—114)

This invention relates to machines for comparing perforation patterns in different records, and particularly to the record feeding means of such machines.

An embodiment of the invention is shown herein as applied to a statistical card comparing machine of the type disclosed in the copending application of Karl J. Braun, S. N. 228,381, filed September 3, 1938, now Patent No. 2,211,094, dated August 13, 1940. Machines of the type shown in said patent are employed in accounting or statistical systems in which master records are used in conjunction with detail records. In these systems it is desirable to compare prepunched designative data contained in the detail records with pre-punched designative data contained in the master records, and to control or effect various other operations in connection with such records in accordance with the comparison, or non-comparison, of the pre-punched data.

In the machine disclosed in the above mentioned patent either of three types of operations can be performed, namely 1. Record sorting (i. e., to segregate comparing master records from non-comparing master records, and to segregate comparing detail records from non-comparing detail records),
2. Record punching (i. e., to reproduce data contained in the master records, other than that used for comparing purposes, in the detail records), or
3. Stopping the machine (e. g., to permit the insertion of control records at desired points in the run of compared records).

Each of these operations may be effected selectively or in combination with either or both of the others upon the sensing of a comparison, or non-comparison, between designative perforation patterns in master and detail records, according to the requirements of a particular accounting or statistical problem. The machine is also provided with variably controllable master and detail record feeding mechanisms, whereby any one of a plurality of different types of master and/or detail record feeding may be effected, in conjunction with any desired combination of the above mentioned sorting, punching, and stopping operations, according to the quantitative relationship of the master and detail records to be handled in a particular problem. The several types of record feeding selectively obtainable by the arrangements disclosed in the above mentioned patent, in accordance with the sensing of a comparison or non-comparison between perforation patterns in master and detail records, may be briefly described, as follows:

1. To feed master and detail records simultaneously either on a comparison, or on a non-comparison.
2. To feed only detail records on a comparison, or on a non-comparison.
3. To feed master and detail records simultaneously on a comparison, and master records on a non-comparison.
4. To feed master and detail records simultaneously on a comparison, and detail records on a non-comparison.
5. To feed detail records on a comparison, and master records on a non-comparison.
6. To feed master records on a comparison, and master and detail records simultaneously on a non-comparison.
7. To feed detail records on a comparison, and master and detail records simultaneously on a non-comparison.
8. To feed master records on a comparison, and detail records on a non-comparison.

Furthermore, an operation selector mechanism is provided whereby a given machine may be preconditioned, in accordance with the several individual types of record handling problems that may arise in a given accounting or statistical system, to effect selectively any one of a plurality of the various available combinational operations of record sorting, and/or record punching, and/or machine stopping, and record feeding. In the particular arrangement shown in the above mentioned application, the operation selector mechanism is controlled by an operation selector dial, manually settable to eight positions, whereby a statistical card comparing machine may be arranged to effect any one of eight of such combinational operations selectively.

The principal object of the present invention is to increase the flexibility of the record feeding means of record comparing machines.

Of the above mentioned types of record feeding described in the above mentioned application, only the fifth, wherein detail records are fed on a comparison and master records are fed on a non-comparison, need be considered in detail herein. This type of record feeding is employed in statistical and accounting systems in which a presorted master record file is to be compared with a presorted detail record file wherein the detail file comprises a plurality of groups of detail records and the records of each group are perforated with common designative data, and wherein the master file comprises one comparing master record for each group of detail records (i. e., a master record perforated with designative data corresponding to the common designative data of the detail records of the associated group), and, in addition, may include non-comparing master records (i. e., master records having designative data for which there are no counterparts in the detail file). Under these conditions, when a comparison is sensed between the designative perforation patterns of a master record and the first detail record of a group, the master record perforation pattern is retained, and detail record feeding is initiated and is continued during each machine cycle until the first detail record of the next group is sensed. Inasmuch as the designative data in this record differs from that in the retained master record perforation pattern, a non-comparison is sensed. When this occurs, the detail record is retained and master record feeding is initiated. In the event that the designative data in the succeeding master record compares with that of the retained detail record, detail record feeding is resumed, as above. However, in the event that the designative data in the succeeding master record does not compare with that of the retained detail record, master record feeding is continued, during each machine cycle, until the comparing master record for the detail record group represented by the retained detail record is sensed. Thereupon, detail record feeding is resumed, as above, until the first record of the succeeding group is sensed. Thus, in this type of operation, non-comparing, or excess, master records are passed through the machine without affecting the disposition of the detail records.

It will be noted, that with this type of record feeding, the punching, sorting, and machine stopping control mechanisms, described in the above mentioned patent, may be arranged to effect any one of the individual or combinational operations graphically illustrated in Fig. 74 of the patent, as desired, to obtain the corresponding result graphically illustrated in Fig. 79 thereof.

In many accounting and statistical systems, however, problems frequently arise in which, in the master and detail record files to be handled, the number of groups of detail records are in excess of the number of master records, i. e., the detail file comprises a plurality of groups of detail records for each of which there is a comparing master record in the master file, and also includes groups of detail records for which there are no comparing master records. Under these conditions, the above memtioned type of record feeding is not applicable since it is apparent that upon the sensing of the first detail record of a group, for which there is no comparing master record, master record feeding would be initiated and continued until the master record file is exhausted. To accommodate a record comparing machine for handling this type of problem, the present invention provides, as its principal feature, means to prevent the feeding of more than one master card after the sensing of the first non-comparison following a comparison, and to effect detail record feeding after each succeeding cycle in which a non-comparison is sensed, as well as after cycles in which comparisons are sensed. By this arrangement, the perforation pattern of each master record is retained in the master record reading retaining mechanism until the associated detail record group is compared therewith, despite the fact that non-comparing groups of detail records may be compared therewith in the meanwhile.

The invention also provides, as an additional feature, manually settable means to effect selectively either of the above described types of record feeding, independently of the operation selector dial, whereby the number of different record handling operations that may be performed by a given machine may be substantially increased;

A preferred form of the invention is shown in the drawings, in which,

Fig. 3 is a view taken along the line 3—3 of Fig. 1, showing the relative positions of the operation selector dial and the card feed control lever;

Fig. 4 is a detail of the control device actuating mechanism, showing the parts in the position attained at the end of a cycle in which a comparison is sensed;

Fig. 5 is an enlarged detail of the inner ratchet of the control device actuating mechanism;

Fig. 6 is an enlarged detail of the outer ratchet of the control device actuating mechanism;

Fig. 7 is a detail of the operating mechanism for the card stop in the detail card sensing chamber, in normal position, and includes a portion of the control mechanism associated therewith;

Fig. 8 is a detail of the retract mechanism in the master card reading retaining mechanism, in normal position, and includes a portion of the control mechanism associated therewith;

Fig. 9 is a schematic illustration of the principal elements of a statistical card comparing machine of the type disclosed in the above mentioned patent;

Figure 11:
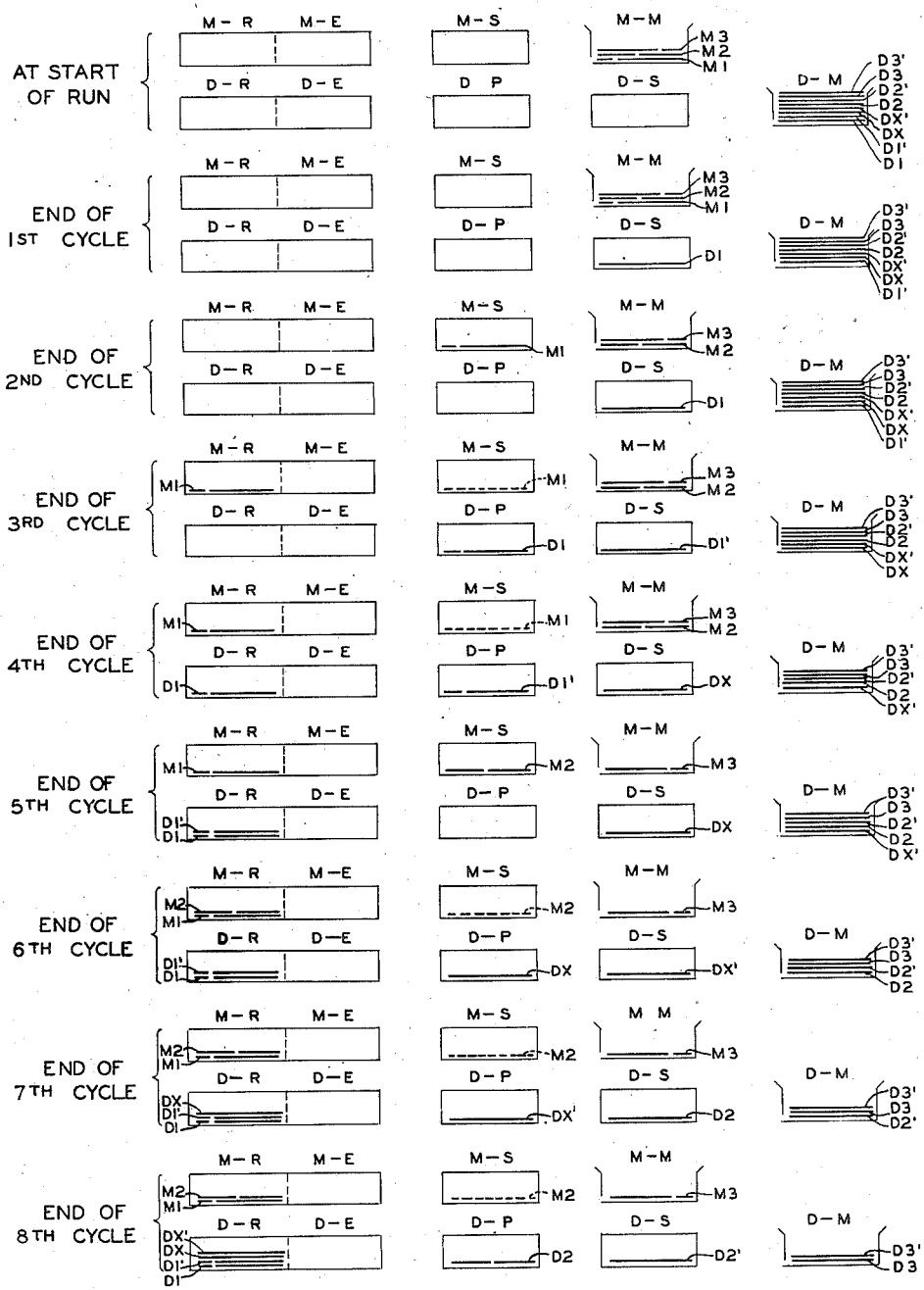

Fig. 11 comprises a series of schematic views illustrating the manner of progression of master and detail cards when card feeding control cam 750, of the patent, is effective for operation in conjunction with the mechanism of the invention.

To facilitate an understanding of the present invention, a brief description of a statistical card comparing machine of the type disclosed in the above mentioned patent, with which the invention is particularly adapted to function, is included hereinafter. For a detailed description of such machine, reference may be had to the patent.

STATISTICAL CARD COMPARING MACHINE—
BASIC MECHANISM

In machines of the type disclosed in the patent, detail cards are placed in a detail card magazine 170 (see Fig. 9) and are passed seriatim to suitable feed rolls whereby they are conveyed, first, to the detail card sensing chamber in which their perforated data is analyzed, and, second, to a punch chamber in which additional data may be perforated in the cards. From the punch chamber, the detail cards are conveyed to a "receiver" pocket 27, or, in the event the sorting control mechanism described in the application is effective, they are conveyed either to the "receiver" pocket or to an "eject" pocket 28, depending on the setting of the sorting control mechanism and the character of the designative data in the cards. During the period in which a detail card is held in the detail card sensing chamber, the perforation pattern therein is analyzed by sensing pins mounted in a reciprocating pin box of the detail card sensing mechanism. By this means a mechanical representation of such perforation pattern is transmitted, by means of pins in an upper pin box and translator wires in a translator 255, to the detail card comparing pin assembly 445 of the comparing mechanism.

Master cards are placed in a master card magazine 290 and are passed seriatim to suitable feed rolls whereby they are conveyed to the master card sensing chamber in which their perforated data is analyzed. From the master card sensing chamber, the master cards are conveyed to a "receiver" pocket 25, or, in the event the sorting control mechanism described in the application is effective, they are conveyed either to the "receiver" pocket or to an "eject" pocket 26, depending on the setting of the sorting control mechanism and the character of the designative data in the cards. During the period in which a master card is held in the master card sensing chamber, the perforation pattern contained therein is analyzed by sensing pins mounted in a reciprocating pin box of the master card sensing mechanism. By this means a mechanical representation of such perforation pattern is transmitted to pins in a master card reading retaining mechanism wherein it is retained, by suitable locking mechanism, until a new master card is sensed. The movement of the pins in the reading retaining mechanism is transmitted directly to the master card comparing pin assembly 425 of the comparing mechanism.

In the comparing mechanism the mechanical representations of master and detail card perforation patterns are compared and the occurrence of a comparison, or non-comparison, between such perforation patterns is utilized to control or vary machine operations, as hereinafter described.

DETAIL CARD FEEDING MECHANISM

Figure 1:
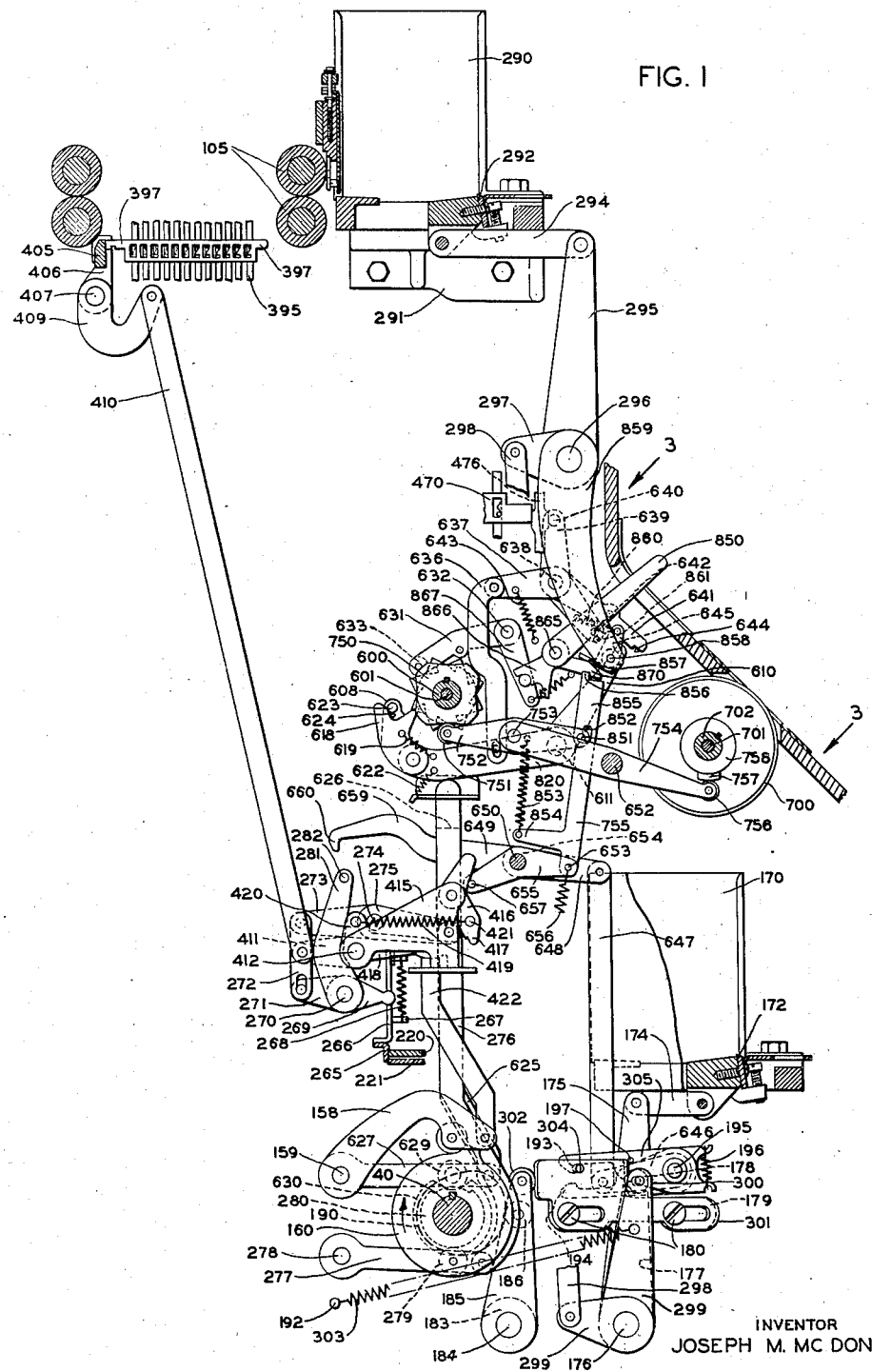
Fig. 1 is a left side elevation of the invention together with the elements of a statistical card comparing machine that cooperate therewith, partly in section, showing the relative positions of the several elements when the machine is in normal or stopping position.

Referring to Fig. 1, detail cards are stored in a detail card magazine 170 supported by brackets bolted to the frame of the machine. A card picker knife 172, arranged to pass the lowermost card to the detail card sensing chamber feed rolls (not shown) is connected by a link 174 to an arm 175 fixed to a rock shaft 176 which may be rocked during each cycle by a card feed cam 190 keyed on a cam shaft 40 which is rotated through one complete revolution during each machine cycle. For this purpose shaft 176 is provided with an inner arm 177 (see also Fig. 2) having a roller 178 coacting with a slide 179 guided on suitable studs 180. The left edge of slide 179 coacts with a roller 181 on an arm 182 fixed to a collar 183 rotatably mounted on a frame stud 184. Also fixed to collar 183 is an arm 185 having a follower roller 186 coacting with card feed cam 190. A strong spring 191, extended between arm 177 and a frame stud 192, resiliently urges arm 177, slide 179 and arm 182 leftwardly whereby follower roller 186 is urged against cam 190. The contour of cam 190 is such (see Fig. 10) that spring 191 urges arm 177 and shaft 176 counterclockwise to cause picker knife 172 to feed a card to the sensing chamber feed rolls during the period from 30° to 120° of a machine cycle, whereas the picker knife is positively returned by the cam during the period from 210° of the same cycle to 30° of the following cycle. It will be noted that the time of restoration of the card feeding mechanism has been slightly modified from that disclosed in the above mentioned patent, for reasons apparent hereinafter.

In each of the card feeding operations referred to above, it is essential that detail card feeding be prevented whenever master cards are fed. To render the detail card feeding mechanism ineffective under these conditions slide 179 is provided with a pin 193 arranged to be engaged by a latch 194 mounted on a rock shaft 195. The latch 194, although rotatably mounted on shaft 195, is resiliently held fast thereto by a spring 196 which holds the upper edge of latch 194 against a pin 197 in an oppositely disposed latch 305 which is fast on the shaft. Thus, latch 194 moves integrally with shaft 195. As hereinafter explained, shaft 195 may be rocked to place latch 194 in either an upper position or a lower position. In its lower position, latch 194 is clear of pin 193, and detail card feeding is effected, as above described. In its upper position, latch 194 engages pin 193 and serves to hold slide 179 against leftward movement as cam 190 rotates, whereby no movement is imparted to rock shaft 176 and detail card feeding is prevented.

DETAIL CARD STOP MECHANISM

Figure 10:
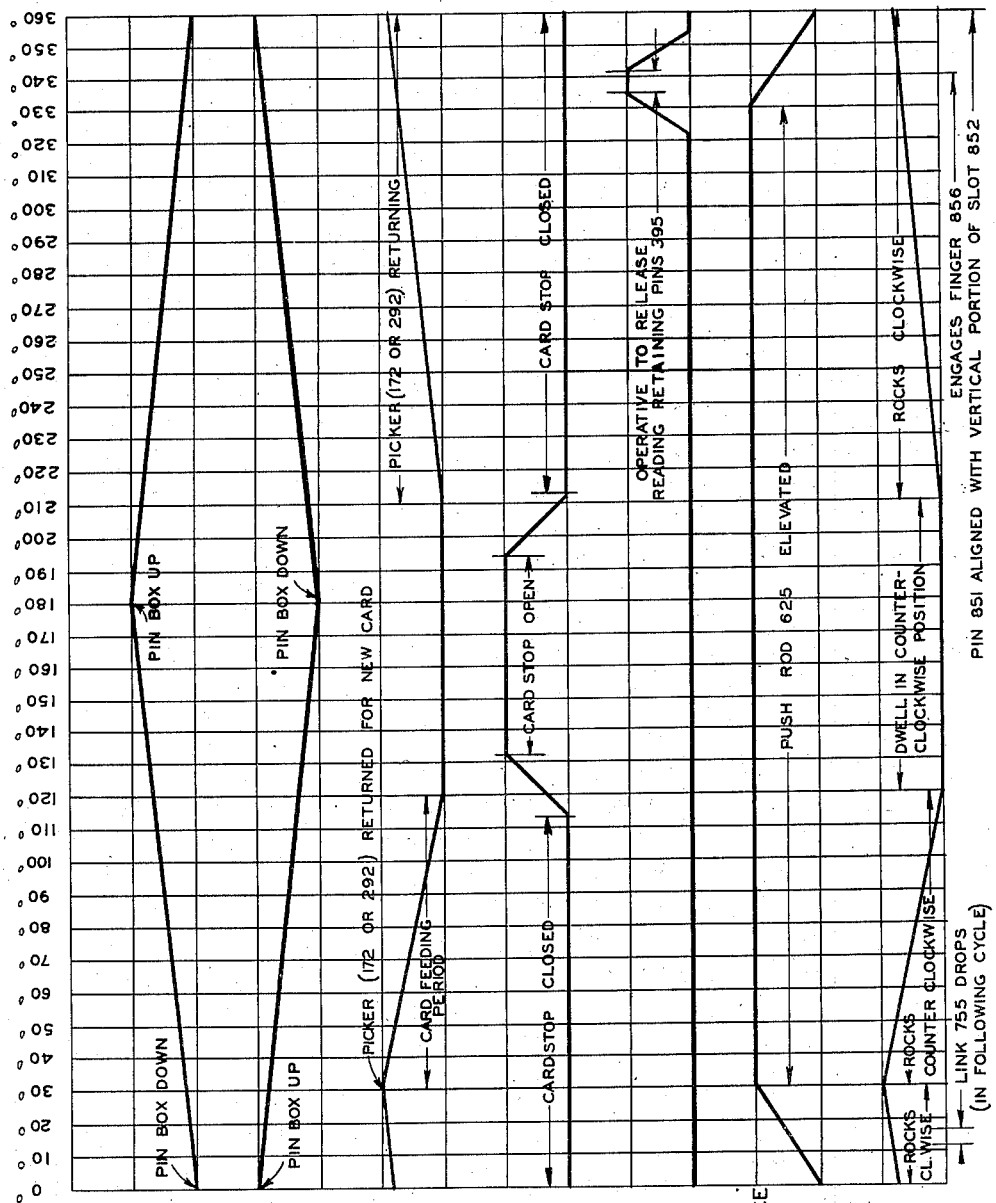
Fig. 10 is a timing diagram.

To retain the detail cards in the detail card sensing chamber 220, 221 (Figs. 1 and 7) during the period in which they are sensed, a card stop mechanism is provided. This device comprises an inverted L-shaped card stop 265 guided for vertical movement by a pair of brackets 266 having slots encompassing studs 267 fixed in the framework of the machine, and urged to its upper or open position by springs 268 extended between studs 267 and studs on brackets 266. To close card stop 265 during the period in which a detail card is sensed, a pair of arms 269, fastened to each end of a transverse rock shaft 270, extends into slots in brackets 266. Also fixed to shaft 270 is an arm 271 joined by a pin-in-slot connection to a link 272 which, in turn, is connected to an arm 273 fast on a rock shaft 274. Shaft 274 is mounted in suitable brackets and is provided with an arm 275 connected by a link 276 to an arm 277, pivoted at 278, having a follower roller 279 cooperating with a card stop cam 280 keyed to cam shaft 40. The arrangement is such, as indicated in Fig. 10, that, when follower roller 279 rides on the high dwell of cam 280 (as in Figs. 1 and 7), card stop 265 is positively moved downwardly to close the sensing chamber, whereas when roller 279 rides on the low dwell of cam 280 springs 268 urge the card stop to open position.

Under certain conditions it is required that card stop 265 be held in closed position to retain a detail card in the detail card sensing chamber even though the card stop is urged to open position by springs 268. For this purpose, an arm 281 is fixed to rock shaft 270 and is provided with a pin 282 arranged to be engaged by a hook 660 on an offset extension 659 of a lever 649 operated by a control device, hereinafter described. When lever 649 is rocked to its extreme counter-clockwise position, hook 660 engages pin 282 and serves to hold card stop 265 in closed position against the tension of springs 268.

MASTER CARD FEEDING MECHANISM

Referring to Fig. 1, the master cards are stored in a master card magazine 290 supported by brackets 291 bolted to the frame of the machine. A card picker knife 292, arranged to pass the lowermost master card to the master card sensing chamber feed rolls 105, is connected by a link 294 to an arm 295 fixed to a rock shaft 296 (see also Fig. 2) which may be rocked during each cycle by card feed cam 190. For this purpose, shaft 296 is provided with an arm 297 connected by a link 298 to the horizontal arm of an offset bell-crank 299 rotatably mounted on rock shaft 176, in front of arm 177 of the detail card feeding mechanism. The vertical arm of bell-crank 299 is provided with a follower roller 300 coacting with a slide 301, similar to slide 179, guided on studs 180. The left edge of slide 301 coacts with a roller 302 (see Fig. 2A) on arm 185 which is provided, as described above, with a follower roller 186 coacting with card feed cam 190. A strong spring 303, extended between the vertical arm of bell-crank 299 and frame stud 192, resiliently urges slide 301 and arm 185 leftwardly whereby follower roller 186 is held against cam 190. As in the case of the detail card feeding mechanism, the contour of cam 190 is such that during the period from 30° to 120° of a machine cycle (see Fig. 10) spring 303 tends to urge bell-crank 299 counter-clockwise, whereby shaft 296 is rocked counter-clockwise to cause picker knife 292 to feed a master card to the master card sensing chamber feed rolls; whereas during the period from 210° of the same cycle to 30° of the following cycle, the picker knife is positively returned by the cam.

In each of the types of card feeding operations, herein described, it is essential that master card feeding be prevented whenever detail cards are fed. To render the master card feeding mechanism ineffective under these conditions, slide 301 is provided with a pin 304 arranged to be engaged by a latch 305 fast on rock shaft 195. As hereinafter explained, shaft 195 may be rocked to place latch 305 in either an upper position or a lower position. In its upper position, latch 305 is clear of pin 304, and master card feeding is effected, as described above. In its lower position, latch 305 engages pin 304 and serves to hold slide 301 against leftward movement as cam 190 rotates, whereby no movement is imparted to bell-crank 299 or rock shaft 296, and master card feeding is prevented.

READING RETAINING RETRACT MECHANISM

As fully described in the above mentioned patent, machines of the type disclosed therein are provided with a reading retaining mechanism to retain a mechanical representation of each master card perforation pattern until the succeeding master card is sensed. This device comprises a plurality of rows of spring-pressed, reading-retaining pins 395 (partially shown in Fig. 1) aligned with and adapted to be depressed by the pins in the master card sensing mechanism, and arranged to be locked in depressed position by spring-urged locking slides 397 to retain a mechanical representation of the perforation pattern sensed in the master card.

To eliminate the possibility of error in the setting up of master card perforation patterns, the reading retaining mechanism is provided with a retract mechanism to release the set-up made by a master card immediately prior to the time a new set-up is made from the succeeding master card. For this purpose a retract bail bar 405 (Figs. 1 and 8) is arranged to coact with the left ends of all slides 397 of the reading retaining mechanism. Bail bar 405 is supported by arms 406 fast on a transverse rock shaft 407 suitably journaled in the frame of the machine. Also fast on shaft 407 is a V-shaped arm 409 connected by a link 410 to an arm 411 fast on a rock shaft 412 journaled in suitable supports. Fixed on the end of shaft 412 is a substantially triangular plate 415 at the apex of which is pivoted a bell-crank 416 having a cutaway shoulder 417, on its pendant arm, adapted to engage the forward end of an arm 418 pivotally mounted on rock shaft 412. Arm 418 overlies the upper end of a push rod 422 connected to an arm 158 which is pivoted at 159 and is provided with a follower roller coacting with a cam 160 on cam shaft 40. With this arrangement, when shoulder 417 is engaged with arm 418, as hereinafter described, cam 160 is effective to rock arm 418 counter-clockwise immediately before the end of a machine cycle (see Fig. 10). A spring 419, extended between a vertical extension 420 on arm 418 and a stud 421 on bell-crank 416, serves to restore arm 418 after each actuation by cam 160, and also serves, unless otherwise prevented, to maintain shoulder 417 in engagement with arm 418 so that each actuation of cam 160 is imparted to plate 415 to rock shaft 412 counter-clockwise. This movement, through arm 411, link 410, and arm 409, serves to rock shaft 407 clockwise to cause bail bar 405 to shift all slides 397 to the right (Fig. 1) to release any depressed pins 395. Therefore, at the end of any machine cycle in the arrangement thus far disclosed, the mechanical representations of a perforation pattern made in the reading retaining mechanism at the beginning of that cycle may be released to permit the mechanical representation of a new perforation pattern to be set up at the beginning of the succeeding cycle. However, as hereinafter described, means are provided to prevent the operation of the retract mechanism of the master card reading retaining mechanism when the master card feeding mechanism is disabled.

COMPARING MECHANISM

In the comparing mechanism the mechanical representations of master and detail card perforation patterns are mechanically compared and the occurrence of a comparison, or non-comparison, between such perforation patterns is utilized to control or vary machine operations. A knowledge of the specific construction of the comparing mechanism is not essential to an understanding of the present invention, but may be obtained from the above mentioned patent. Insofar as the present invention is concerned it is sufficient to understand that the movement of the pins in the master and detail card comparing pin assemblies 425 and 445 (Fig. 9), in accordance with the perforation patterns in master and detail cards, is effective to determined the position of certain comparing slides 470 (partially illustrated in Figs. 1 and 4) one of which is provided for each column of a record card. Abutting each slide 470 is a manually settable interponent 476 which, when that column is to be used for comparing purposes, is set in its upper or effective position, as in Fig. 1. The construction and arrangement of the comparing mechanism is such that in the event the compared perforation patterns are identical, the slides 470 are free to move to the left to permit counter-clockwise movement of a comparing slide sensing bail rod 640 as in Fig. 4. However, if either pattern contains a perforation for which there is no counterpart in the other, one or more of the slides 470 is blocked and, together with its associated interponent 476, serves to prevent the counter-clockwise movement of bail rod 640. The manner in which bail rod 640 is operated to sense the position of comparing slides 470 is described hereinafter under the heading Control device—actuating mechanism.

CONTROL DEVICE

As completely disclosed in the above mentioned patent, each of the mechanisms for effecting or varying machine functions such as card feeding, sorting, punching, and stopping the machine, as the result of the sensing of a comparison, or non-comparison, in the perforation patterns of master and detail cards, are actuated by individual control cams which may be rendered effective either singly or in combination, as desired, and are arranged for step-by-step operation by common actuating mechanism under control of the comparing mechanism. For convenience, the several control cams and their associated mechanisms, the manually settable means for selectively rendering the control cams effective, and the control cam actuating mechanism, are referred to as the control device.

CONTROL DEVICE—ACTUATING MECHANISM

Each of the several control cams employed in a machine of this type is secured to a sleeve 600 (Figs. 1, 2, 2A, 4, 7, and 8) rotatably mounted on a stud 601 fixed in the frame of the machine. Each of the control cams is arranged to control its associated mechanism in one manner when the perforation patterns in master and detail cards compare, and in a different manner when such perforation patterns do not compare. Therefore, the control cams are arranged to be actuated to effect their respective functions whenever a non-comparison is sensed after a cycle in which a comparison was sensed and, also, whenever a comparison is sensed after a cycle in which a non-comparison was sensed. To effect the requisite movement of the control cams, an actuating mechanism, operable under control of the comparing mechanism, is provided to cause recurrent step-by-step movement of sleeve 600. This mechanism comprises an inner ratchet 605 (see Fig. 5) and an outer ratchet 615 (see Fig. 6) each provided with four equally spaced teeth 606 and 616, respectively, and having blank spaces, equivalent to a tooth space, between adjacent teeth. Both ratchets are fast to sleeve 600 (see Fig. 4) but are offset relative to each other so that teeth 616 of ratchet 615 are intermediate to teeth 606 of ratchet 605 whereby, in effect, they combine to form an eight toothed ratchet. Coacting with ratchet 605 is an actuating pawl 608, urged clockwise by a light spring (not shown), carried by the horizontal arm of a lever 610 which is pivoted on a frame stud 611 and is urged counter-clockwise by a spring (not shown). Coacting with ratchet 615 is an actuating pawl 618, urged clockwise by a spring 619, carried by a lever 620 which is also pivoted on stud 611 and is urged counter-clockwise by a spring 622. The arrangement of ratchets 605, 615, and pawls 608, 618, is such that during machine cycles following those in which a comparison was sensed, pawl 608 registers with a blank space on ratchet 605, whereas pawl 618 is in position to register with a tooth 616 on ratchet 615. However, when levers 610 and 620 are in their lowermost positions, a stud 623 on pawl 608 coacts with a cam surface 624 on pawl 618 whereby pawl 618 is moved counter-clockwise against the tension of spring 619 to prevent the engagement of the pawl with a tooth 616.

For operating pawls 608 and 618, an offset push rod 625, provided at its upper end with an abutment 626 arranged to coact with levers 610 and 620, is connected to an arm 627 pivoted at 628 and provided with a follower roller 629 that coacts with a cam 630 keyed to cam shaft 40. The arrangement of cam 630 (see also Fig. 10) is such that levers 610 and 620 are held in their uppermost position by push rod 625 and abutment 626 during the greater part of each cycle but are urged downwardly by their springs at approximately 30° before the end of the cycle, and reach their lowermost positions at the end of the cycle. Thus, during the early part of each cycle push rod 625 is elevated and, in the event either pawl 608 or 618 has engaged a tooth 606 or 616, respectively, is effective to actuate sleeve 600 through one-eighth of a revolution. However, in the event pawls 608 or 618 are not engaged with ratchets 605 or 615, respectively, levers 610 and 620 are operated idly and no movement is imparted to sleeve 600. A spring urged detent arm 631, pivoted at 632 and having a roller 633 arranged to coact with a detent plate 635 fast on sleeve 600, is provided to center sleeve 600 in each of its several positions.

In order to effect an actuation of sleeve 600 whenever there is a non-comparison between master and detail card perforation patterns in a cycle following one in which a comparison was sensed, and vice versa, means are provided to sense the position of comparing slides 470 of the comparing mechanism during each cycle and to control actuating pawls 605 and 615 accordingly. For this purpose, an offset vertical link 636 is joined by a pin-in-slot connection to lever 620 and is connected at its upper end to the horizontal arm of a bell-crank 637 pivotally mounted on a transverse rock shaft 638. Secured to shaft 638 are two arms 639 supporting a bail rod 640 which is adapted, through manually settable interponents 476, to sense the position of comparing slides 470. Also fast on rock shaft 638 is an oblique arm 641 which is spring urged into engagement with a limit stud 642 on the pendant arm of bell-crank 637, and is provided with a cutaway shoulder 644 arranged to engage a latch face 645 on an upwardly extending arm of lever 610. The entire assembly comprising shaft 638, bell-crank 637, arms 639 and 641 is urged counter-clockwise by a comparatively strong spring 643 extended between the horizontal arm of the bell-crank and a frame stud.

At the beginning of each cycle cam 630 elevates push rod 625 and, through lever 620, link 636, bell-crank 637, and arm 641, rocks shaft 638 clockwise to move bail rod 640 out of engagement with interponents 476. Toward the end of each cycle, shortly after comparing slides 470 have been positioned, follower roller 629 rides into the low dwell of cam 630 thereby lowering lever 620 and link 636, and permitting spring 643 to urge bell-crank 637 and shaft 638 counter-clockwise. In the event all comparing slides 470 in the columns containing designative data are free to move leftwardly, as in the case when the compared perforation patterns in master and detail cards are identical, bail rod 640 is free to move leftwardly whereby shaft 638 rocks counter-clockwise and withdraws shoulder 644 on arm 641 from the path of movement of latch face 645 as lever 610 is rocked counter-clockwise. In this case, when levers 610 and 620 rock to their lowermost positions, pawl 608 rides on a blank space of ratchet 605, and stud 623 coacts with cam face 624 to prevent the engagement of pawl 618 with ratchet 615. Thus, when a cycle in which a comparison is sensed follows a cycle in which a comparison was sensed, no movement is imparted to sleeve 600, and the control cams thereon function in the same manner as in the preceding cycle. However, in the event one, or more, of the comparing slides 470 is held in its extreme rightward position when shaft 638 is urged counter-clockwise, as in the case when the perforation patterns in master and detail cards are not identical, bail rod 640 is prevented from moving leftwardly. Shaft 638 is thereby held in rocked position and retains shoulder 644 on arm 641 in the path of movement of latch face 645. In this case, the left end of lever 610 is held in its uppermost position as lever 620 descends. Thus, stud 623 is ineffective to prevent the engagement of pawl 618 whereby spring 619 engages pawl 618 with a tooth 616 on ratchet 615 when lever 620 reaches its lowermost position. Immediately thereafter, push rod 625 is again elevated to actuate lever 620 and pawl 618 which, in turn, actuate sleeve 600. Thus, when a cycle in which a non-comparison is sensed follows a cycle in which a comparison was sensed, sleeve 600 is rotated through one step by lever 620, and the control cams thereon are positioned to control their associated mechanisms accordingly.

In the event another non-comparison is sensed at the end of the succeeding cycle, lever 610 is retained in its uppermost position, as above. In this case, since pawl 618 is now in register with a blank space on ratchet 615, lever 620 moves idly and no further movement is imparted to sleeve 600. This condition is maintained as long as the perforation patterns in simultaneously sensed master and detail card perforation patterns do not compare. However, when the next comparison is sensed, bail rod 640 and shaft 638 are free to rock counter-clockwise and serve to disengage shoulder 644 from latch face 645 to permit lever 610 to follow push rod 625 downwardly. In this case, since pawl 608 is now in register with a tooth 606 on ratchet 605, the subsequent elevation of push rod 625 is effective to actuate sleeve 600. Thus, when a cycle in which a comparison is sensed follows a cycle in which a non-comparison was sensed, sleeve 600 is rotated through one step by lever 610, and the control cams thereon are positioned to control their associated mechanisms accordingly.

CONTROL DEVICE—CARD FEED CONTROL MECHANISM

A. *Operation of card feed disabling latches*

In order to effect each of the several types of card feeding referred to in the above mentioned patent, selectively settable means are provided to control the operation of the master and detail card feeding mechanisms, as desired. As heretofore explained, the master and detail card feeding mechanisms are each normally arranged to feed cards during each machine cycle but either may be prevented from operation if the associated disabling latch 305 or 194 (see Figs. 2 and 2A), respectively, is rendered effective. For conveniently controlling the effectiveness or ineffectiveness of these latches, rock shaft 195, on which they are mounted, is provided with a rock arm 646 (see also Fig. 7) connected to a vertical link 647. The upper end of link 647 is connected to the rightwardly extending arm 648 of a lever 649 fast on a rock shaft 650 suitably journaled in the frame of the machine. As described in the patent, shaft 650 may be rocked to either one or two of three positions by each of the several card feed control cams and discs, disclosed therein, whereby link 647 may be held in either a lower, an intermediate, or an upper position.

Figure 2A:
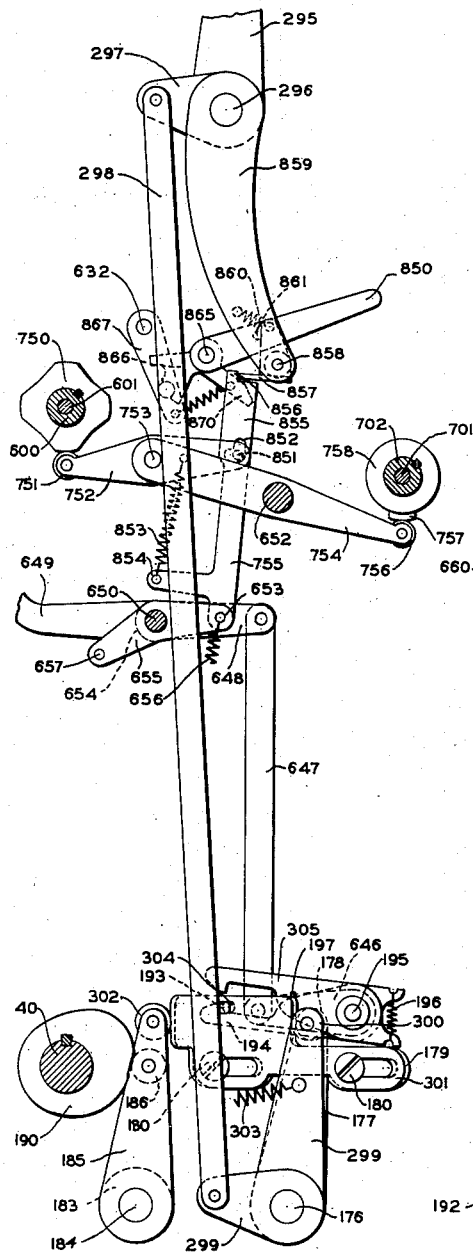
Fig. 2A is an enlarged left side elevation of the invention in conjunction with the card feeding mechanism, showing the relative positions of the several elements at the end of a cycle following the sensing of a non-comparison.
Figure 2:
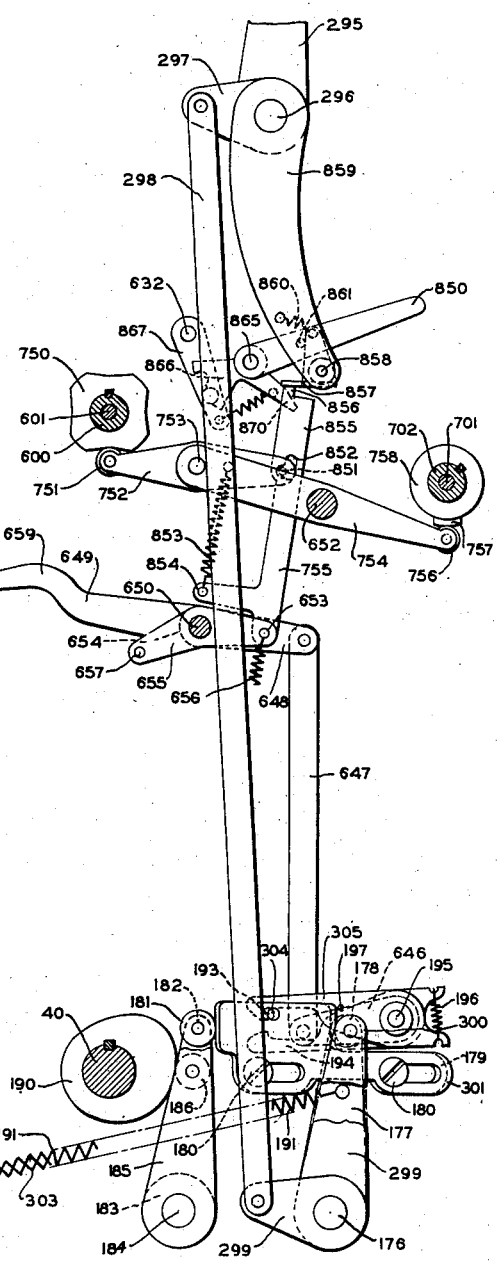
Fig. 2 is an enlarged left side elevation of the invention in conjunction with the card feeding mechanism, showing the relative positions of the several elements at the end of a cycle following the sensing of a comparison.

In the lower position of link 647, rock arm 646 rocks shaft 195 counter-clockwise, as shown in Fig. 2, whereby latch 194 is moved out of the path of movement of pin 193, whereas latch 305 is engaged with pin 304. In this position of the parts, slide 179 is free to move leftwardly to effect detail card feeding under control of cam 190, but slide 301 is retained in its rightward position to prevent master card feeding. In the upper position of link 647, rock arm 646 rocks shaft 195 clockwise, as shown in Fig. 2A, whereby latch 305 is moved to its upper position out of the path of movement of pin 304, whereas latch 194 is engaged with pin 193. In this position of the parts, slide 301 is free to move leftwardly to effect master card feeding under control of cam 190, but slide 179 is retained in its rightward position to prevent detail card feeding. The intermediate position of link 647, in which latches 305 and 194 are both held out of the path of movement of pins 304 and 193 to permit simultaneous master and detail card feeding, need not be considered in connection with the present invention.

With reference to Fig. 10, it will be noted that cam 630 serves to actuate sleeve 600, on which the card feed control cams for positioning link 647 are mounted, prior to the time that card feed cam 190 is effective to cause master or detail card feeding. Thus, the sensing, at the end of a cycle, of a condition that necessitates the disabling of either card feed mechanism is effective to cause such disabling to occur at the beginning of the succeeding cycle.

B. *Control of card feeding mechanisms by cam 750*

As mentioned heretofore, means are provided to effect card feeding operation in accounting and statistical systems wherein master cards are compared with groups of detail cards, and wherein the number of master cards may exceed the number of groups of detail cards. In this type of card handling problem, the detail cards of each group contain identical designative perforation patterns, and the master card stack comprises a card, having a corresponding designative perforation pattern, for each group of detail cards and, in addition, may contain one or more cards having perforation patterns for which there are no counterparts in the detail card stack. Then, for properly effecting the sorting, punching, and stopping operations described in the cited application, the detail cards are fed during each machine cycle as long as the perforation patterns therein compare with the mechanical representations of the perforation pattern in a master card. However, when a non-comparison is sensed, the detail card containing the non-comparing perforation pattern is retained in the detail card sensing chamber, further detail card feeding is prevented, and master card feeding is effected during one or more cycles until the sensing of a master card perforation pattern corresponding to that of the detail card held in the detail card sensing chamber. Thereupon, the mechanical representation of the master card perforation pattern is retained, further master card feeding is prevented and detail card feeding is resumed during one or more cycles until the sensing of a detail card perforation pattern that does not correspond to the retained mechanical representation of the master card perforation pattern, i. e., until the sensing of the first detail card of the succeeding detail card group.

To effect this type of operation, a cam 750 (Figs. 1, 2, 7, and 8) is keyed to sleeve 600 of the control device. Cam 750 is provided with four working portions each including a low dwell, arranged to prevent master card feeding and, as hereinafter described, to prevent the operation of the retract mechanism in the master card reading retaining mechanism, and a high dwell arranged to prevent detail card feeding and, as hereinafter described, to retain the card stop in the detail card sensing chamber in effective position. Coacting with cam 750 (see Figs. 1 and 2) is a roller 751 carried on the left end of a lever 752 pivoted, at 753, on the left end of a lever 754 pivotally mounted on a frame stud 652. The right end of lever 752 is provided with a stud 851 that extends into an L-shaped slot 852 in a link 755 that is connected to a cross rod 653 which is supported by an arm 654 (Fig. 7) and a lever 655 (see Fig. 8), each of which is fast on rock shaft 650. A spring 853, extended between a horizontal arm on link 755 and a pin on lever 752, urges link 755 clockwise and serves to retain stud 851 in the left end of the horizontal portion of slot 852 so that, in this type of operation, lever 752 may be considered as pivotally connected to link 755. The arrangement of this linkage is such that when cam 750 is rendered effective to control card feeding, lever 754 is rocked clockwise as hereinafter described, to elevate pivot 753 and move roller 751 against a low dwell of the cam. Lever 752 is thereby rocked clockwise about pivot 753 and, through elements 755, 653, 654, 655, rocks shaft 650 clockwise. This movement, through arm 648, serves to move link 647 to its lower position. A comparatively heavy spring 656 on cross rod 653 retains roller 751 in operative relationship with cam 750.

In this position of the parts, latch 305 (see Fig. 2) is held engaged with pin 304 to prevent master card feeding, and latch 194 is held out of the path of movement of pin 193 to permit detail card feeding. Thus, detail card feeding is effected during each machine cycle as long as roller 751 remains in register with a low dwell of cam 750, i. e., as long as the designative perforation patterns in successively sensed detail cards compare with the retained master card perforation pattern. When a non-comparison is sensed sleeve 600 is actuated, as described above, to place a high dwell of cam 750 in register with roller 751. Lever 752 is thereby rocked counter-clockwise about pivot 753 and, through elements 755, 653, 654, 655, rocks shaft 650 counter-clockwise. This movement, through arm 648, serves to raise link 647 to its upper position. In this position of the parts, latch 194 (see Fig. 2A) is held engaged with pin 193 to prevent detail card feeding, and latch 305 is held out of the path of movement of pin 304 to permit master card feeding. Thus, master card feeding is effected during each cycle as long as roller 751 remains in register with a low dwell of cam 750, i. e., as long as the designative perforation patterns in successively sensed master cards do not compare with the perforation pattern of the detail card held in the detail card sensing chamber.

C. Control of reading retaining retract mechanism by cam 750

To retain a mechanical representation of the perforation pattern of a master card during the time that the detail cards of the detail card group having corresponding perforation patterns are compared therewith, means are provided to prevent the operation of the retract mechanism in the master card reading retaining mechanism when a comparison is sensed during this type of operation. For this purpose the left end of lever 655 (see Figs. 1, 2, and 8) is provided with a stud 657 that underlies the upper arm of bell-crank 416 (Fig. 8) of the reading retaining retract mechanism. When shaft 650 is rocked clockwise as the result of the sensing of a comparison, i. e., when sleeve 600 is actuated to place a low dwell of cam 750 in register with roller 751, stud 657 rocks bell-crank 416 counter-clockwise to disengage shoulder 417 from arm 418. This condition is maintained as long as roller 751 remains in register with a low dwell on cam 750. Therefore, when cam 160 elevates push rod 422 at the end of the cycle, arm 418 is ineffective to rock plate 415 and shaft 412, whereby no movement is imparted to retract bail bar 405. As a result, all locking slides 397 of the reading retaining mechanism are held in their leftward positions by their springs and serve to retain all reading retaining pins 393, that were depressed when the master card was sensed, in their lowermost positions. Thus, a mechanical representation of the perforation pattern in the last sensed master card is retained by the reading retaining mechanism and is compared with the perforation pattern of each succeeding detail card of the group in succeeding machine cycles. This condition is maintained until a detail card with a non-comparing perforation pattern is sensed, e. g., the first detail card of the next detail card group. Thereupon, sleeve 600 is again actuated, as described above, to place the adjacent high dwell of cam 750 in register with roller 751 whereby shaft 650 and lever 655 are rocked counter-clockwise. This movement permits spring 419 to reengage shoulder 417 of bell-crank 416 with arm 418 to permit the resumption of operation of the reading retaining retract mechanism. This condition is maintained as long as the perforation patterns in successively sensed master cards do not compare with the perforation pattern in the retained detail card. When a comparing master card is passed into the master card sensing chamber a comparison is sensed and, after the perforation pattern of such card is set up in the reading retaining mechanism, the reading retaining retract mechanism is disabled, as above, during the period that comparing detail cards are compared therewith.

Thus, in this type of operation under control of cam 750, the reading retaining retract mechanism is effective to release master card perforation patterns when non-comparisons are sensed, but is ineffective to release master card perforation patterns when comparisons are sensed.

D. *Control of card stop mechanism by cam 750*

To retain the last fed detail card in the detail card sensing chamber until a master card having a corresponding perforation pattern is sensed, means are provided to retain the card stop of the detail card sensing chamber in its effective or closed position when a non-comparison is sensed during this type of operation. For this purpose, a leftwardly extending arm 659 of lever 649 (see Figs. 1, 2, and 7) is provided with a hooked portion 660 arranged to engage stud 282 (Fig. 7) on arm 281 which, as described above, is fast on rock shaft 270 of the card stop mechanism of the detail card sensing chamber. With reference to Figs. 4 and 10, it will be noted that sleeve 600 is actuated by cam 630, at a time when card stop cam 280 is effective to hold shaft 270 rocked to close card stop 265. When shaft 650 is rocked counter-clockwise as the result of the sensing of a non-comparison, i. e., when sleeve 600 is actuated to place a high dwell of cam 750 in register with roller 751, hook 660 engages stud 282. This condition is maintained as long as roller 751 is in register with a high dwell on cam 750. Therefore, when roller 279 rides onto the low dwell of cam 280, during the mid-portion of the cycle, springs 268 are ineffective to open card stop 265. As a result, the last fed detail card is retained in the detail card sensing chamber, and is compared with the perforation pattern of the succeeding master card in the cycle following that in which the non-comparison was sensed. This condition is maintained until a master card having a perforation pattern, corresponding to that of the last fed detail card, is sensed. Thereupon sleeve 600 is again actuated as described above, to place the adjacent low dwell of cam 750 in register with roller 751. Shaft 650 and lever 649 are thereby rocked clockwise to disengage hook 660 from stud 282 and permit the resumption of operation of the card stop mechanism in the detail card sensing chamber during each machine cycle. This condition is maintained as long as the perforation patterns in successively sensed detail cards compare with the retained master card perforation pattern. When the first card of the following detail card group is passed into the detail card sensing chamber, a non-comparison is sensed and such card is retained in the sensing chamber, as above, until a master card with a corresponding perforation pattern is compared therewith.

Thus, in this type of operation under control of cam 750, the card stop in the detail card sensing chamber is held closed throughout an entire cycle to retain a detail card when a non-comparison is sensed, but is free to operate in its usual manner when a comparison is sensed.

E. *Description of operation under control of cam 750*

If, at the start of a run, it be assumed that the master card reading retaining mechanism contains the mechanical representation of a master card perforation pattern corresponding to that of the first group of detail cards, the low dwell of cam 750 is effective, as in Figs. 1 and 2, to prevent master card feeding to permit detail card feeding, and to prevent the retraction of locking slides 397 of the master card reading retaining mechanism. Thus, the mechanical representation of the master card perforation pattern is retained in the reading retaining mechanism and is compared successively with the perforation patterns of each detail card of the group during succeeding machine cycles.

When the first detail card of the following group is fed to the detail card sensing chamber a non-comparison is sensed and sleeve 600 is actuated by cam 630, as described heretofore, to place the adjacent high dwell of cam 750 in register with roller 751. This movement, through lever 752, link 755, etc., serves to rock shaft 650 counter-clockwise whereby (1), through arm 648 (Fig. 2) link 647 is moved to its upper position to prevent further detail card feeding, and to permit the operation of the master card feeding mechanism, (2), stud 657 on lever 655 (Fig. 8) releases bellcrank 416 to permit the resumption of operation of the retract mechanism in the master card reading retaining mechanism, and, (3), hook 660 (Fig. 7) on arm 659 engages stud 282 to retain card stop 265 in effective position to hold the first detail card of the new group in the detail card sensing chamber.

Thereafter, master cards are fed during each cycle and are compared with the detail card retained in the sensing chamber until a master card having a corresponding perforation pattern is sensed. Thereupon sleeve 600 is again actuated, as described above, to place the adjacent low dwell of cam 750 in register with roller 751 whereby shaft 650 and levers 649 and 655 are rocked clockwise to the positions shown in Figs. 1, 2, 7, and 8. This movement serves (1), to move link 647 to its lower position (as in Fig. 2) to prevent further master card feeding, and to permit the resumption of detail card feeding, (2), to cause stud 657 to rock bell-crank 416 counter-clockwise (as in Fig. 8) to prevent the operation of the retract mechanism in the master card reading retaining mechanism, and (3), to disengage hook 660 from stud 282 (as in Fig. 7) to permit the resumption of operation of the card stop mechanism in the detail card sensing chamber.

Thereafter, the detail cards of the second group are compared with the retained master card perforation pattern until the first card of the third group is sensed. Thereupon, detail card feeding is again prevented and master card feeding is resumed, as above. Thus, when cam 750 is effective in this type of operation, it may be said to be operative to feed detail records only on a comparison, and master records only on a non-comparison.

For convenience of explanation in the foregoing description of card feeding operations under control of cam 750, it was assumed that a master card perforation pattern was already set up in the master card reading retaining mechanism when the run was started. Ordinarily, however, there is no set-up in the reading retaining mechanism at the start of a run, and all reading retaining pins 395 are in their upper position. Thus, when the first detail card is fed into the detail card sensing chamber, a non-comparison is sensed immediately. Thereupon, master card feeding is effected until a comparison is sensed, whereupon the feeding of detail cards of the first group is resumed, and operation continues, as above. Thus, the foregoing description of operation is identical, in effect, with the actual operation but has not been interrupted with a discussion of collateral matter.

CONTROL DEVICE—OPERATION SELECTOR MECHANISM

In order to render cam 750 effective for controlling card feeding operations, means corresponding to those disclosed in the above mentioned patent are provided to select this cam for operation. For this purpose, a cam lug 757 may be placed at any desired position on a disc 758 secured to a sleeve 702 of the operation selector mechanism which is pivotally mounted on a frame stud 701. Then, when operation selector dial 700, also fast on sleeve 702, is rotated to a position to place a lug 757 in register with a roller 756, carried on the right end of lever 754, lever 754 is rocked clockwise to elevate pivot 753 whereby roller 751 is moved into operative relationship with cam 750 to render the cam effective for controlling card feeding operations.

CONTROL DEVICE—MODIFIED CONTROL OF CARD FEED MECHANISM

With the devices thus far described the statistical card comparing machine disclosed in the patent is adapted to effect proper operation of the card feeding, detail card stop, and reading retaining retract mechanisms when employed in accounting or statistical systems in which a number of groups of detail cards are to be compared with a greater number of master cards. However, in a system in which the number of groups of detail cards is in excess of the number of master cards (i. e., in a system in which the detail card file comprises a group of comparing detail cards for each master card in the master file and also includes groups of detail cards for which there are no comparing masters) these devices are not adapted to effect proper operation since the sensing of a detail card for which there is no comparing master card would result in causing master card feeding until the master card file is exhausted. In the latter type of card handling system it is apparent that the perforation pattern of each master card must be retained until the group of detail cards having corresponding designative perforation patterns are compared therewith, and that the groups of non-comparing detail cards must be passed through the machine without effecting the disposition of the master cards.

To obtain this result the present invention provides means, operable in conjunction with the above described card feeding, card stop, and retract mechanisms, to prevent the feeding of more than one master card after the sensing of a non-comparison following the sensing of a comparison, and to effect detail card feeding after each succeeding cycle in which a non-comparison is sensed, as well as after all cycles in which comparisons are sensed. By this arrangement, the perforation pattern of each master card is retained in the reading retaining mechanism until the detail card group having corresponding designative perforation patterns is compared therewith, despite the fact that groups of non-comparing detail cards may have been compared therewith in the interim.

To effect this type of operation, the pivotal connection between lever 752 and link 755, described in the cited application, is replaced by a pin-in-slot connection comprising a pin 851 (Fig. 1) fixed in the right end of lever 752 and an L-shaped slot 852 in link 755. A light spring 853, extended between a horizontal arm 854 on link 755 and a stud on lever 752, tends to rock link 755 clockwise, and, unless otherwise prevented, serves to hold stud 851 in the left end of the horizontal portion of slot 852. Link 755 is also provided with a vertical extension 855 having a finger 856 capable of coacting with a bail 857 pivotally mounted on a stud 858 in an arm 859 which is fixed to rock shaft 296 of the master card feeding mechanism. A spring 860, extended between pins in arm 859 and bail 857, serves, unless otherwise prevented, to hold the vertical arm of the bail in contact with a stud 861 in arm 859 and thereby maintain the bail in a substantially horizontal position. The arrangement of these elements is such that when a comparison is sensed, (i. e., when roller 751 is placed in register with a low dwell of cam 750) finger 856 is below bail 857, whereas, when a non-comparison is sensed (i. e., when roller 751 is placed in register with a high dwell of cam 750), lever 752 is rocked counter-clockwise to elevate link 755 and move finger 856 into the path of movement of bail 857.

Thus, when a comparison is sensed, cam 750 is operative to effect the several operations described above under the heading Description of operation under control of cam 750 when a comparison is sensed, namely, to 1. Prevent master card feeding, and to permit detail card feeding during the following cycle,
2. Prevent the operation of the reading retaining retract mechanism whereby the perforation pattern set up by the last sensed master card is retained, and,
3. To permit cyclical operation of the card stop mechanism in the detail card sensing chamber.

Cam 750 remains operative to effect these operations as long as comparisons continue to be sensed in successive cycles.

When a non-comparison is sensed after the sensing of a comparison, cam 750 is rotated to place a high dwell thereon in register with roller 751 whereby the cam is operative for one cycle to effect the several operations described under the above mentioned heading, when a non-comparison is sensed, namely, to 1. Prevent detail card feeding, and to permit master card feeding during the following cycle,
2. Permit the operation of the retract mechanism in the master card reading retaining mechanism, and
3. Hold the detail card stop in effective position to retain the last sensed detail card in the detail card sensing chamber.

However, inasmuch as the counter-clockwise movement imparted by cam 750 to lever 752 serves to elevate link 755 and extension 855, finger 856 is raised into the path of movement of bail 857 in the early portion of the cycle following the sensing of the non-comparison. Immediately thereafter (see Fig. 10) shaft 296 is rocked clockwise under control of cam 190 to feed a new master card into the master card sensing chamber. This movement, through arm 859, serves to withdraw bail 857 from engagement with finger 856. In the latter part of the cycle shaft 296 is rocked clockwise by cam 190 to restore picker arm 295 to a position to feed a new master card. In the latter portion of this movement, bail 857 on arm 859 engages finger 856 and serves to rock link 755 counter-clockwise against the tension of spring 853. At the end of this cycle the several elements attain the positions shown in Fig. 2A in which the link 755 is rocked sufficiently to place the vertical portion of slot 852 substantially in alignment with stud 851 on lever 752. In this position, spring 656 on cross rod 653 tends to pull link 755 downwardly, and to rock shaft 650 clockwise to the position usually attained when roller 751 is in register with a low dwell on cam 750. However, referring to Fig. 10, it will be noted that card feed cam 190 does not begin to cause card feeding until 30° of a cycle have elapsed, and does not fully restore the card feeding mechanisms until 30° of the following cycle. Thus, at the end of the cycle following the sensing of the non-comparison, cam 190 has not restored slides 179 and 301 to their extreme rightward positions, and latch 194 is still engaged with stud 193 on slide 179 of the detail card feeding mechanism. In this position of the parts, the pressure exerted by spring 191 is sufficient to maintain stud 193 engaged with latch 194 despite the pressure exerted by spring 656. However, at approximately 15° of the following cycle, cam 190 is effective to move slide 179 slightly to the right to provide a slight clearance between stud 193 and latch 194. When this occurs, spring 656 is effective to rock shaft 650 clockwise to the limit of the vertical portion of slot 852, i. e., to the position usually attained when roller 751 is in register with a low dwell of cam 750, so that, 1. Link 647 is moved to its lower position to engage latch 305 with pin 304 to prevent further master card feeding, and to disengage latch 194 from pin 193 to permit the resumption of detail card feeding,
2. stud 657 on lever 655 (see Fig. 8) rocks bellcrank 416 counter-clockwise to prevent further operation of the reading retaining retract mechanism, whereby the perforation pattern of the last sensed master card is retained, and
3. hook 660 on lever 649 (see Fig. 7) is disengaged from stud 282 to permit the resumption of cyclical operation of the card stop mechanism in the detail card sensing chamber.

Thus, after one master card is fed as the result of the sensing of a non-comparison, detail cards are fed during succeeding cycles even though cam 750 remains in position to effect master card feeding, i. e., as long as non-comparisons continue to be sensed. This condition is maintained, and a detail card is fed during each succeeding cycle until the first detail card of the group having designative perforation patterns corresponding to the retained perforation pattern of the last sensed master card is passed into the detail card sensing chamber. When this occurs, a comparison is sensed at the end of the cycle and, as a result of such sensing, sleeve 600 is advanced one step by the control device actuating mechanism, as described above, to place roller 751 in register with a low dwell of cam 750. Then, inasmuch as shaft 650 has already been moved to its extreme clockwise position, spring 853 is effective first, to rock lever 752 clockwise whereby roller 751 is moved against the low dwell of cam 750 and stud 851 is moved to the lower end of the vertical portion of slot 852, and second, to rock link 755 clockwise to the limit of the horizontal portion of slot 852. Thus, when a comparison is sensed the several elements are restored to the positions shown in Fig. 2 wherein cam 750 is operative to continue detail card feeding. This condition is maintained as long as a comparison is sensed in each succeeding cycle, i. e., until all the cards of the detail card group having designative perforation patterns corresponding to the retained perforation pattern of the last sensed master card are passed through the detail card sensing mechanism.

When the first card of the following detail card group is passed into the sensing chamber, a non-comparison is sensed and sleeve 600 is advanced one step by the control device actuating mechanism, as described above, to position cam 750 for causing master card feeding whereby the next master card is fed to the master card sensing mechanism. In the event the perforation pattern in this card compares with that of the detail card held in the detail card sensing chamber, sleeve 600 is again advanced one step whereby cam 750 is positioned to prevent further master card feeding and to cause feeding of the remaining detail cards of the group. However, in the event the perforation pattern in the new master card does not compare with that of the detail card held in the detail card sensing chamber, bail 857 on arm 859 is operative to effect the same result without affecting the position of sleeve 600 and the control cams mounted thereon.

Thus, when card feeding is controlled by cam 750 in conjunction with the mechanism of the present invention, master card feeding is effected for one cycle after the sensing of each non-comparison that follows the sensing of a comparison, whereas detail card feeding is effected after the sensing of each succeeding non-comparison of a series of non-comparisons, as well as after the sensing of each comparison.

The utility of this arrangement can be readily appreciated when it is considered in conjunction with the punching, sorting, and stopping control mechanisms disclosed in the above mentioned patent, as applied to actual card handling problems. For example, let it be assumed that perforation patterns of prepunched quantitative data contained in master cards, which are also prepunched with designative data, are to be reproduced in detail cards with comparing prepunched designative data in a system in which the detail card file comprises a group of comparing detail cards for each master card in the master file and also includes groups of detail cards for which there are no comparing master cards. To condition the machine for handling this type of problem, the control device is arranged so that the mechanism of the present invention, card feed control cam 750, and punch control cam 770 are rendered effective to operate conjointly. In this manner, master and detail card feeding is controlled as described above, and detail card punching is controlled as described in the patent, i. e., to permit punching in comparing detail cards and to prevent punching in non-comparing detail cards (see operation No. 3 on Fig. 74 of the patent).

Fig. 11 is included herewith to illustrate, by a specific example, the manner in which these operations are effected. In this example, let it be assumed that the designative data in the detail card groups represented by cards D1 and D1', D2 and D2', and D3 and D3' correspond respectively to the designative data in master cards M1, M2, and M3, whereas there is no master card having designative data corresponding to the detail cards DX and DX'. The quantitative data contained in each master card is schematically indicated by a broken line.

If it be assumed that there are no cards in the machine prior to the beginning of the run, the comparing mechanism is in the position attained when a comparison is sensed (i. e., as in Fig. 2) so that detail card feeding is effected when the machine is started.

In the first cycle, after the machine is started, detail card DI is fed from the detail card magazine D—M to the detail card sensing chamber D—S. In the latter part of the cycle detail card DI is sensed. However, inasmuch as there is no set-up in the master card reading retaining mechanism, the comparing mechanism senses a non-comparing condition at the end of the cycle.

In the second cycle, due to the sensing of the non-comparison, sleeve 600 and the cams thereon are advanced one step whereby detail card DI is retained in the detail card sensing chamber, further detail card feeding is prevented, and master card feeding is initiated. During this cycle, master card MI is fed from the master card magazine M—M to the master card sensing chamber M—S, and the designative data therein is compared with that of detail card DI. Inasmuch as these cards have corresponding designative perforation patterns, a comparison is sensed at the end of the cycle.

In the third cycle, due to the sensing of the comparison, sleeve 600 and the cams thereon are again advanced one step whereby further master card feeding is prevented, the master card perforation pattern is retained, and detail card feeding is resumed. During this cycle, detail card DI is passed from sensing chamber D—S to the punch chamber D—P wherein the quantitative data of the retained master card perforation pattern is reproduced therein, as described in the cited application. Also during this cycle, detail card DI' is passed into sensing chamber D—S wherein its designative data is sensed and compared with the retained perforation pattern of master card MI. Inasmuch as these cards have corresponding designative perforation patterns, a comparison is sensed at the end of the cycle.

It will be noted, as described in the patent, that although the master card perforation pattern is retained, the master card itself is passed out of the master card sensing chamber during the cycle following that in which it was sensed. This arrangement is provided to prevent the excessive wear of the master card that would be caused by successive sensing operations in the event a plurality of detail cards is to be compared therewith. To clarify the present explanation, a dotted line in master card sensing chamber M—S is used to represent a retained master card perforation pattern, whereas the master card itself is represented in its actual position by a full line. It will also be noted that inasmuch as sorting control cam 780, the function of which is fully described in the patent, is not operative in the present illustration, the mechanism controlled thereby is not effective to segragate comparing and non-comparing detail and master cards. Therefore, all master cards are conveyed from master card sensing chamber M—S to the master card receiver pocket M—R. Likewise, all detail cards are conveyed from punch chamber D—P to the detail card receiver pocket D—R. No cards are conveyed to the master card eject pocket M—E, or to the detail card eject pocket D—E.

In the fourth cycle, inasmuch as another comparison was sensed, no movement is imparted to sleeve 600 of the control mechanism. As a result, the perforation in pattern of master card MI is retained by the reading retaining mechanism, the master card feeding mechanism remains disabled, and detail card feeding is continued. During this cycle, detail card DI is conveyed to detail card receiver pocket D—R, and detail card DI' is conveyed to punch chamber D—P in which the quantitative data of the retained master card perforation pattern is reproduced therein. Also during this cycle, detail card DX, the first card of the non-comparing detail card group, is passed into sensing chamber D—S, wherein its designative data is sensed, and is compared with the retained perforation pattern of master card MI. Inasmuch as the designative perforation patterns in these cards do not correspond, a non-comparison is sensed at the end of the cycle.

In the fifth cycle, due to the sensing of the non-comparison, sleeve 600 and the cams thereon are again advanced one step whereby punch control cam 770 is positioned to prevent detail card punching, as described in the patent. This movement also serves to position cam 750 to retain detail card DX in sensing chamber D—S, to prevent further detail card feeding, and to resume master feeding. During this cycle detail card DI' is passed to receiver pocket D—R. Also during this cycle, master card M2 is fed into master card sensing chamber M—S and the designative data therein is sensed and compared with that of detail card DX. Inasmuch as the designative perforation patterns in these cards do not correspond, a non-comparison is again sensed at the end of this cycle.

Inasmuch as this is the second successive non-comparison, no movement is imparted to sleeve 600 of the control mechanism during the sixth cycle. Thus, punch control cam 770 remains in position to prevent detail card punching, and card feed cam 750 remains in position to continue master card feeding. However, since the sensing of the first non-comparison was effective to raise finger 856 into the path of movement of the bail 857, the bail served to rock link 755 to its counter-clockwise position in the latter portion of the fifth cycle, and thereby permit spring 656 to rock shaft 650 clockwise in the early part of the sixth cycle to shift from master card feeding to detail card feeding. Thus, during the sixth cycle, the perforation pattern of master card M2 is retained by the reading retaining mechanism, further master card feeding is prevented, and detail card feeding is resumed. It will be noted that the change in operation of the card feeding mechanisms was effected without altering the position of the sleeve 600 of the control mechanism. Therefore, punch control cam 770 remains in position to prevent detail card punching. As a result, although detail card DX is passed into punch chamber D—P during the sixth cycle, the quantitative data contained in master card M2 is not reproduced in the detail card. Also during the sixth cycle, detail card DX', the second card of the non-comparing detail card group, is passed into sensing chamber D—S, wherein its designative data is sensed, and is compared with the retained perforation pattern of master card M2. Inasmuch as the designative perforation patterns in these cards do not correspond, another non-comparison is sensed at the end of the cycle.

In the seventh cycle, since another successive non-comparison was sensed, no movement is imparted to sleeve 600 of the control mechanism. Thus, as in the sixth cycle, punch control cam 770 remains in position to prevent detail card punching, and shaft 650 is held rocked by spring 656 whereby the perforation pattern of master card M2 is retained by the reading retaining mechanism, the master card feeding mechanism is held disabled to prevent master card feeding, and the detail card feeding mechanism is free to continue detail card feeding. During this cycle, detail card DX is passed to detail receiver pocket D—R, and detail card DX' is passed to punch chamber D—P. However, since cam 770 is in position to prevent punching, as in the sixth cycle, the perforation pattern of master card M2 is not reproduced in detail card DX'. Also during this cycle, detail card D2, the first card of the group having designative data corresponding to that in master card M2, is passed into sensing chamber D—S wherein its designative data is sensed, and is compared with the retained perforation pattern of master card M2. Inasmuch as the designative perforation patterns in these cards correspond, a comparison is sensed at the end of the cycle.

In the eighth cycle, due to the sensing of the comparison, sleeve 600 and the cams thereon are again advanced one step whereby cam 770 is positioned to permit detail card punching, and a low dwell of cam 750 is placed in register with roller 751. In this manner the parts are restored to the position shown in Fig. 2 wherein spring 656 continues to hold shaft 650 rocked clockwise whereby the perforation pattern of master card M2 is retained by the reading retaining mechanism, the master card feeding mechanism is held disabled to prevent master card feeding, and the detail card feeding mechanism is free to continue detail card feeding. During this cycle, detail card DX' is conveyed to detail receiver pocket D—R, and detail card D2 is conveyed to punch chamber D—P wherein the quantitative data of master card M2 is reproduced in the detail card. Also, during this cycle, detail card D2' is passed into sensing chamber D—S wherein its designative data is sensed, and is compared with the retained perforation pattern of master card M2. Inasmuch as the designative perforation patterns in these cards correspond, a comparison is sensed at the end of the cycle. During succeeding cycles, with the arrangement of cards shown in Fig. 11, master card feeding, detail card feeding, and detail card punching are effected in the same manner as in the first four cycles, described above, so that the quantitative data contained in master card M3 is reproduced in the comparing detail cards D3 and D3'.

Thus, when the mechanism of the invention, card feed control cam 750, and punch control cam 770 are rendered effective conjointly, master and detail card feeding is effected in such a manner that the quantitative data from each master card is reproduced in each card of the group of detail cards having corresponding designative data, but no data is reproduced in the non-comparing groups of detail cards. From the foregoing description it is apparent that the type of card feeding obtained by the conjoint operation of card feed cam 750 and the mechanism of the invention may be used in conjunction with any type of card handling operation set forth in the chart on Fig. 74 of the above mentioned patent when the quantitative relationship of the cards to be handled so requires.

Manual Selection of Modified Card Feed Control

It has been found that in the various ramifications of accounting and statistical systems, it is frequently desirable to compare a file of master cards with a file of groups of detail cards, in one instance, when the number of master cards exceeds the number of groups of detail cards, and, in another instance, when the number of groups of detail cards exceeds the number of master cards. To effect proper card feeding in each instance, the control device of a statistical card comparing machine may be provided with a cam 750 and its associated mechanism, as originally described in the above mentioned patent, for controlling card feeding when there is an excess of master cards, and with a second cam 750, operable in conjunction with the mechanism of the present invention, as described above, for controlling card feeding when there is an excess of groups of detail cards. In this case, each train of mechanism would be separately rendered effective for operation under control of the operation selector dial. However, it is apparent that the provision of two cams 750 would decrease the number of different control cams that may be arranged on sleeve 600 of the control device, and thereby tend to decrease the number of different card handling operations that may be effected on one machine.

To avoid this condition, the invention provides manually settable means whereby either type of card feeding may be effected selectively by employing merely a single card feeding cam 750. For this purpose, a lever 850 (Fig. 1), the handle of which protrudes through a slot in the frame of the machine, is fixed to a collar pivotally mounted on a frame stud 865. Fixed to the collar on which lever 850 is mounted is a detent plate 866, and an arm 870 that is arranged beneath bail 857. Suitable notches in detent plate 866 cooperate with a stud in a spring urged detent arm 867, pivoted on a frame stud 632, whereby lever 850, when manually shifted, is retained in either an upper position U (see Fig. 3) or a lower position L.

When lever 850 is moved to its upper position, as in Fig. 1, arm 870 rocks bail 857 clockwise about its pivot 858 to prevent any coaction between the bail and finger 856 on link 755. In this setting, spring 853 serves to retain stud 851 in the left end of the horizontal portion of slot 852 whereby lever 752 and link 755 function as though pivotally connected. Thus, the master and detail card feeding mechanisms are controlled solely by cam 750 to effect detail card feeding after the sensing of each comparison, and to effect master card feeding after the sensing of each non-comparison, as described above under the heading Control device—card feed control mechanism.

When lever 850 is moved to its lower position, as in Figs. 2 and 2A, arm 870 is moved out of engagement with bail 857. In this setting, bail 857 is effective to cause relative displacement of link 755 and lever 752 when a non-comparison is sensed, as described above under the heading Control device—modified control of card feed mechanism. Thus, the card feeding mechanisms are controlled conjointly by cam 750, bail 857 and the associated elements to effect master card feeding for one cycle after the sensing of each non-comparison that follows the sensing of a comparison, and to effect detail card feeding after the sensing of each succeeding non-comparison of a series of non-comparisons, as well as after the sensing of each comparison.

Thus, when the operation selector dial is positioned to render com 750 effective, the machine may be conditioned to obtain proper master and detail card feeding, in either of the above mentioned instances, merely by setting lever 850 accordingly.

Should the arrangement of cards in a given system so require, cam 750 may be offset 45° relative to sleeve 600, as described in the above mentioned patent, whereby it is operative to effect master car feeding after the sensing of each comparison and to effect detail card feeding after the sensing of each non-comparison. If required, cam 750 may also be offset when used in conjunction with the above described invention. In this case, master card feeding is effected for one cycle after the sensing of each comparison that follows the sensing of a non-comparison, and detail card feeding is effected after the sensing of each succeeding comparison, of a series of comparisons as well as after each non-comparison. A detailed description of the manner of operation of the invention in conjunction with cam 750, when cam 750 is offset, is not included herein since it is believed to be apparent to those skilled in the art in view of the foregoing description of the card feeding control exercised by these elements when cam 750 is in its original position.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, means operable under the control of the comparing means to move said locking means positively to its second position when a comparison is sensed and to permit said impositive means to move said locking means to its first position when a non-comparison is sensed, and means operative when a comparison is sensed to disengage said last recited means from said locking means after one machine cycle.

2. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, positioning means operable under the control of the comparing means to move said locking means positively to its second position when a comparison is sensed and to permit said impositive means to move said locking means to its first position when a non-comparison is sensed, means also operative when a comparison is sensed to disengage said positioning means from said locking means after one machine cycle, and means to reengage said positioning means with said locking means when the following non-comparison is sensed.

3. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, positioning means operable under the control of the comparing means to move said locking means positively to its second position when a comparison is sensed and to permit said impositive means to function when a non-comparison is sensed, means operative when effective to disengage said positioning means from said locking means after one machine cycle when a comparison is sensed, and means to render said last recited means effective or ineffective.

4. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, means operable under the control of the comparing means to move said locking means positively to its second position when a non-comparison is sensed and to permit said impositive means to move said locking means to its first position when a comparison is sensed, and means operative when a non-comparison is sensed to disengage said last recited means from said locking means after one machine cycle.

5. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, positioning means operable under the control of the comparing means to move said locking means positively to its second position when a non-comparison is sensed and to permit said impositive means to move said locking means to its first position when a comparison is sensed, means also operative when a non-comparison is sensed to disengage said positioning means from said locking means after one machine cycle, and means to reengage said positioning means with said locking means when the following comparison is sensed.

6. In a machine for handling master and detail records and including a comparing means for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, positioning means operable under the control of the comparing means to move said locking means positively to its second position when a non-comparison is sensed and to permit said impositive means to function when a comparison is sensed, means operative when effective to disengage said positioning means from said locking means after one machine cycle when a non-comparison is sensed, and means to render said last recited means effective or ineffective.

7. In a machine for operating on master and detail records and including a comparing mechanism for sensing comparisons or non-comparisons between perforation patterns in preselected portions of such records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, a first positioning means arranged when effective to operate under the control of the comparing mechanism to move said locking means to its second position when a non-comparison is sensed and to permit said impositive means to move said locking means to its first position when a comparison is sensed, a second positioning means arranged when effective to operate under the control of the comparing mechanism to move said locking means to its second position when a comparison is sensed and to permit said impositive means to move said locking means to its first position when a non-comparison is sensed, means to render either of said positioning means effective selectively, and means operative in conjunction with the positioning means that is rendered effective either to disengage said first positioning means from said locking means after one machine cycle when a non-comparison is sensed or to disengage said second positioning means from said locking means after one machine cycle when a comparison is sensed.

8. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a control mechanism arranged when effective to operate under the control of the comparing mechanism to set said deflector in its first position when a comparison is sensed and in its second position when a non-comparison is sensed, and means to render said control mechanism effective concomitantly with either of said positioning means.

9. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a control mechanism arranged when effective to operate under the control of the comparing mechanism to set said deflector in its second position when a comparison is sensed and in its first position when a non-comparison is sensed, and means to render said control mechanism effective concomitantly with either of said positioning means.

10. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a control mechanism arranged when effective to operate under the control of the comparing mechanism to set the punch locking mechanism in its first position when a comparison is sensed and in its second position when a non-comparison is sensed, and means to render said control mechanism effective concomitantly with either of said positioning means.

11. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a control mechanism arranged when effective to operate under the control of the comparing mechanism to set the punch locking mechanism in its second position when a comparison is sensed and in its first position when a non-comparison is sensed, and means to render said control mechanism effective concomitantly with either of said positioning means.

12. The invention set forth in claim 7 in combination with a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a control mechanism arranged when effective to operate under the control of the comparing mechanism to set the stopping mechanism governing member in its first position when a comparison is sensed and in its second position when a non-comparison is sensed, and means to render said control mechanism effective concomitantly with either of said positioning means.

13. The invention set forth in claim 7 in combination with a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a control mechanism arranged when effective to operate under the control of the comparing mechanism to set the stopping mechanism governing member in its second position when a comparison is sensed and in its first position when a non-comparison is sensed, and means to render said control mechanism effective concomitantly with either of said positioning means.

14. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a first control mechanism arranged when effective to operate under the control of the comparing mechanism to set the punch locking mechanism in its first position when a comparison is sensed and in its second position when a non-comparison is sensed, a second control mechanism arranged when effective to operate under the control of the comparing mechanism to set said deflector in its first position when a comparison is sensed and in its second position when a non-comparison is sensed, and means to render said control mechanisms effective concomitantly with either of said positioning means.

15. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a first control mechanism arranged when effective to operate under the control of the comparing mechanism to set the punch locking mechanism in its first position when a comparison is sensed and in its second position when a non-comparison is sensed, a second control mechanism arranged when effective to operate under the control of the comparing mechanism to set said deflector in its second position when a comparison is sensed and in its first position when a non-comparison is sensed, and means to render said control mechanisms effective concomitantly with either of said positioning means.

16. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a first control mechanism arranged when effective to operate under the control of the comparing mechanism to set the punch locking mechanism in its second position when a comparison is sensed and in its first position when a non-comparison is sensed, a second control mechanism arranged when effective to operate under the control of the comparing mechanism to set said deflector in its first position when a comparison is sensed and in its second position when a non-comparison is sensed, and means to render said control mechanisms effective concomitantly with either of said positioning means.

17. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a first control mechanism arranged when effective to operate under the control of the comparing mechanism to set the punch locking mechanism in its second position when a comparison is sensed and in its first position when a non-comparison is sensed, a second control mechanism arranged when effective to operate under the control of the comparing mechanism to set said deflector in its second position when a comparison is sensed and in its first position when a non-comparison is sensed, and means to render said control mechanisms effective concomitantly with either of said positioning means.

18. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

19. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

20. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

21. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

22. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being setable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set the punch locking mechanism in its first position when a comparison is sensed and in its second position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

23. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set the punch locking mechanism in its first position when a comparison is sensed and in its second position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

24. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set the punch locking mechanism in its second position when a comparison is sensed and in its first position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

25. The invention set forth in claim 7 in combination with a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set the punch locking mechanism in its second position when a comparison is sensed and in its first position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

26. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the punch locking mechanism in its first position when a comparison is sensed and in its second position when a non-comparison is sensed, a third control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

27. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the punch locking mechanism in its second position when a comparison is sensed and in its first position when a non-comparison is sensed, a third control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

28. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the punch locking mechanism in its first positon when a comparison is sensed and in its second position when a non-comparison is sensed, a third control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

29. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the punch locking mechanism in its second position when a comparison is sensed and in its first position when a non-comparison is sensed, a third control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

30. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the punch locking mechanism in its first position when a comparison is sensed and in its second position when a non-comparison is sensed, a third control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

31. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the punch locking mechanism in its second position when a comparison is sensed and in its first position when a non-comparison is sensed, a third control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

32. The invention set forth in claim 7 in combination with a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the punch locking mechanism in its first position when a comparison is sensed and in its second position when a non-comparison is sensed, a third control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

33. The invention set forth in claim 7 in combination with a detail record conveying means for pasing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a punch mechanism for transferring additional perforation patterns from the master records to the detail records, a locking mechanism governing the operation of the punch mechanism, said locking mechanism being settable to a plurality of positions and arranged in a first position to permit the operation of the punch mechanism, and in a second position to prevent the operation of the punch mechanism, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the punch locking mechanism in its second position when a comparison is sensed and in its first position when a non-comparison is sensed, a third control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

34. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a control mechanism arranged when effective to operate under the control of the comparing mechanism to set said deflector in its first position when a comparison is sensed and in its second position when a non-comparison is sensed, and means to render said control mechanism effective concomitantly with either of said positioning means.

35. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a control mechanism arranged when effective to operate under the control of the comparing mechanism to set said deflector in its second position when a comparison is sensed and in its first position when a non-comparison is sensed, and means to render said control mechanism effective concomitantly with either of said positioning means.

36. The invention set forth in claim 7 in combination with a punch mechanism for transferring additional perforation patterns from the master records to the detail records, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a control mechanism arranged when effective to operate under the control of the comparing mechanism to set the stopping mechanism governing member in its first position when a comparison is sensed and in its second position when a non-comparison is sensed, and means to render said control mechanism effective concomitantly with either of said positioning means.

37. The invention set forth in claim 7 in combination with a punch mechanism for transferring additional perforation patterns from the master records to the detail records, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a control mechanism arranged when effective to operate under the control of the comparing mechanism to set the stopping mechanism governing member in its second position when a comparison is sensed and in its first position when a non-comparison is sensed, and means to render said control mechanism effective concomitantly with either of said positioning means.

38. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

39. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its first position when a comparison is sensed and in its second position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

40. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the stopping mechanism governing member in its first position when a comparison is sensed and in its second position when a non-comparison is sensed, and means to render said control mechanisms effective concomitantly with either of said positioning means.

41. The invention set forth in claim 7 in combination with a punch mechanism for transferring additional perforation patterns from the master records to the detail records, a detail record conveying means for passing detail records to a receiving pocket, a deflector governing the operation of the conveying means, said deflector being settable to a plurality of positions and arranged in a first position to permit the conveyance of records to the receiving pocket, and in a second position to prevent the conveyance of records to the receiving pocket, a machine stopping mechanism, a member governing the operation of the stopping mechanism, said member being settable to a plurality of positions and arranged in a first position to render the stopping mechanism ineffective to stop the machine, and in a second position to render the stopping mechanism effective to stop the machine, a first control mechanism arranged when effective to operate under the control of the comparing mechanism to set said deflector in its second position when a comparison is sensed and in its first position when a non-comparison is sensed, a second control mechanism arranged when effective to operate under the control of the comparing mechanism to set the stopping mechanism governing member in its second position when a comparison is sensed and in its first position when a non-comparison is sensed, and means to render said control mechanisms effective concomitantly with either of said positioning means.

42. In a machine for operating on master and detail records, including a comparing mechanism for sensing comparisons or non-comparisons between perforation patterns in preselected portions of such records and a punch mechanism for transferring additional perforation patterns from the master records to the detail records, the combination of a master record feeding mechanism and a detail record feeding mechanism, each of such feeding mechanisms being operable to effect record feeding during each machine cycle, a locking means movable to a first position to prevent the operation of the master record feeding mechanism or to a second position to prevent the operation of the detail record feeding mechanism, impositive means to urge said locking means to its first position, means operable under the control of the comparing mechanism to move said locking means positively to its second position when a non-comparison is sensed and to permit said impositive means to move said locking means to its first position when a comparison is sensed, and means operative when a non-comparison is sensed to disengage said last recited means from said locking means after one machine cycle.

43. In a machine for operating on master and detail records including a comparing mechanism for sensing comparisons or non-comparisons between perforation patterns in preselected portions of such records, a punch mechanism operable to transfer additional perforation patterns from the master records to the detail records, a sorting mechanism operable to segregate comparing and non-comparing records, a stopping mechanism operable to stop the machine, and selectively settable means to operate said punching, sorting, and stopping mechanisms under the control of the comparing mechanism in accordance with the comparison or non-comparison between perforation patterns in the preselected portions of the master and detail records, the combination of a master record feeding mechanism and a detail record feeding mechanism, each of such feeding mechanisms being operable during each machine cycle to feed a record to a position wherein it is sensed by said comparing mechanism, a locking means movable to a first position to prevent the operation of the master record feeding mechanism or to a second position to prevent the operation of the detail record feeding mechanism, impositive means to urge said locking means to its first position, means operable under the control of the comparing mechanism to move said locking means positively to its second position when a non-comparison is sensed and to permit said impositive means to move said locking means to its first position when a comparison is sensed, and means operative when a non-comparison is sensed to disengage said last recited means from said locking means after one machine cycle.

JOSEPH M. McDONNELL.